United States Patent
Singh et al.

(10) Patent No.: US 8,295,284 B1
(45) Date of Patent: Oct. 23, 2012

(54) DYNAMIC, CONDITON-BASED PACKET REDIRECTION

(75) Inventors: Sumeet Singh, Saratoga, CA (US); Muninder Singh Sambi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 347 days.

(21) Appl. No.: 12/698,382

(22) Filed: Feb. 2, 2010

(51) Int. Cl.
*H04L 12/28* (2006.01)
*H04L 12/56* (2006.01)
(52) U.S. Cl. ........................................ 370/392; 370/389
(58) Field of Classification Search .................. 370/389, 370/392, 352–353, 401
See application file for complete search history.

(56) References Cited

U.S. PATENT DOCUMENTS

| | | | | |
|---|---|---|---|---|
| 5,289,462 A * | 2/1994 | Ahmadi et al. | ................ | 370/232 |
| 6,829,219 B1 * | 12/2004 | Honda et al. | ................ | 370/230 |
| 7,031,314 B2 * | 4/2006 | Craig et al. | ................ | 370/392 |
| 7,539,175 B2 * | 5/2009 | White et al. | ................ | 370/350 |
| 7,761,596 B2 * | 7/2010 | Bhargava et al. | ............. | 709/238 |
| 7,869,366 B1 * | 1/2011 | Muppala et al. | ............... | 370/238 |
| 8,107,457 B2 * | 1/2012 | White et al. | ................... | 370/350 |
| 2002/0141393 A1 * | 10/2002 | Eriksson et al. | ............... | 370/352 |
| 2003/0053448 A1 * | 3/2003 | Craig et al. | ..................... | 370/353 |
| 2003/0067922 A1 * | 4/2003 | Yoshitani | ........................ | 370/394 |
| 2004/0098511 A1 * | 5/2004 | Lin et al. | ......................... | 709/249 |
| 2006/0193295 A1 * | 8/2006 | White et al. | ................... | 370/336 |
| 2007/0055789 A1 * | 3/2007 | Claise et al. | .................. | 709/234 |
| 2008/0005293 A1 * | 1/2008 | Bhargava et al. | ............. | 709/223 |
| 2009/0168701 A1 * | 7/2009 | White et al. | ................... | 370/328 |
| 2009/0193428 A1 * | 7/2009 | Dalberg et al. | ............... | 718/105 |
| 2009/0310610 A1 * | 12/2009 | Sandstrom | ..................... | 370/392 |
| 2012/0027015 A1 * | 2/2012 | Carney et al. | ................. | 370/392 |

* cited by examiner

*Primary Examiner* — Chuong T Ho
(74) *Attorney, Agent, or Firm* — Baker Botts L.L.P.

(57) ABSTRACT

In one embodiment, at a packet-forwarding engine for receiving packet flows and conditionally routing packets in the packet flows to one or more applications, a method includes receiving from a particular one of the applications a request that requests the packet-forwarding engine not to route the particular one of the packet flows to the particular one of the applications and identifies one or more conditions for routing particular ones of the packets in the particular one of the packet flows to the particular one of the applications. The method further includes, receiving a particular packet in the particular one of the packet flows, determining whether one or more of the conditions for routing the particular packet to the particular one of the applications are met, and routing or not routing the particular packet to the particular one of the applications based on the determination.

30 Claims, 3 Drawing Sheets

DYNAMIC, CONDITON-BASED PACKET REDIRECTION

TECHNICAL FIELD

This disclosure relates generally to conditionally routing packets to service nodes.

BACKGROUND

Packet-based communication networks transmit data encapsulated in packets. To facilitate the delivery of rich services to clients or end users, a packet-based network system may utilize service engines to provide certain network services not included in the standard Internet Protocol (IP). These services may be implemented as applications running on the service engines, which may be implemented in integrated service blades or external network appliances. Conventionally, a network administrator or end user must specify static rules that govern which packet flows or packets are routed to a particular application for processing. Such static rules or instructions may be defined for each application or service engine. All traffic that matches a specified set of static rules is re-routed by the forwarding engine to a particular application for processing. By way of example, a user may specify a rule that a particular virtual local area network (VLAN) be routed and processed by a particular application. However, if the traffic routed to an application is more than the service engine can process, the service engine can become a bottleneck as the data throughput of each service engine may be significantly below that of the switch.

DESCRIPTION OF EXAMPLE EMBODIMENTS

Overview

In one embodiment, at a packet-forwarding engine for receiving packet flows and conditionally routing packets in the packet flows to one or more applications, a method includes receiving from a particular one of the applications a request that requests the packet-forwarding engine not to route the particular one of the packet flows to the particular one of the applications and identifies one or more conditions for routing particular ones of the packets in the particular one of the packet flows to the particular one of the applications. The method further includes, receiving a particular packet in the particular one of the packet flows, determining whether one or more of the conditions for routing the particular packet to the particular one of the applications are met, and routing or not routing the particular packet to the particular one of the applications based on the determination.

DESCRIPTION

Figure 1:
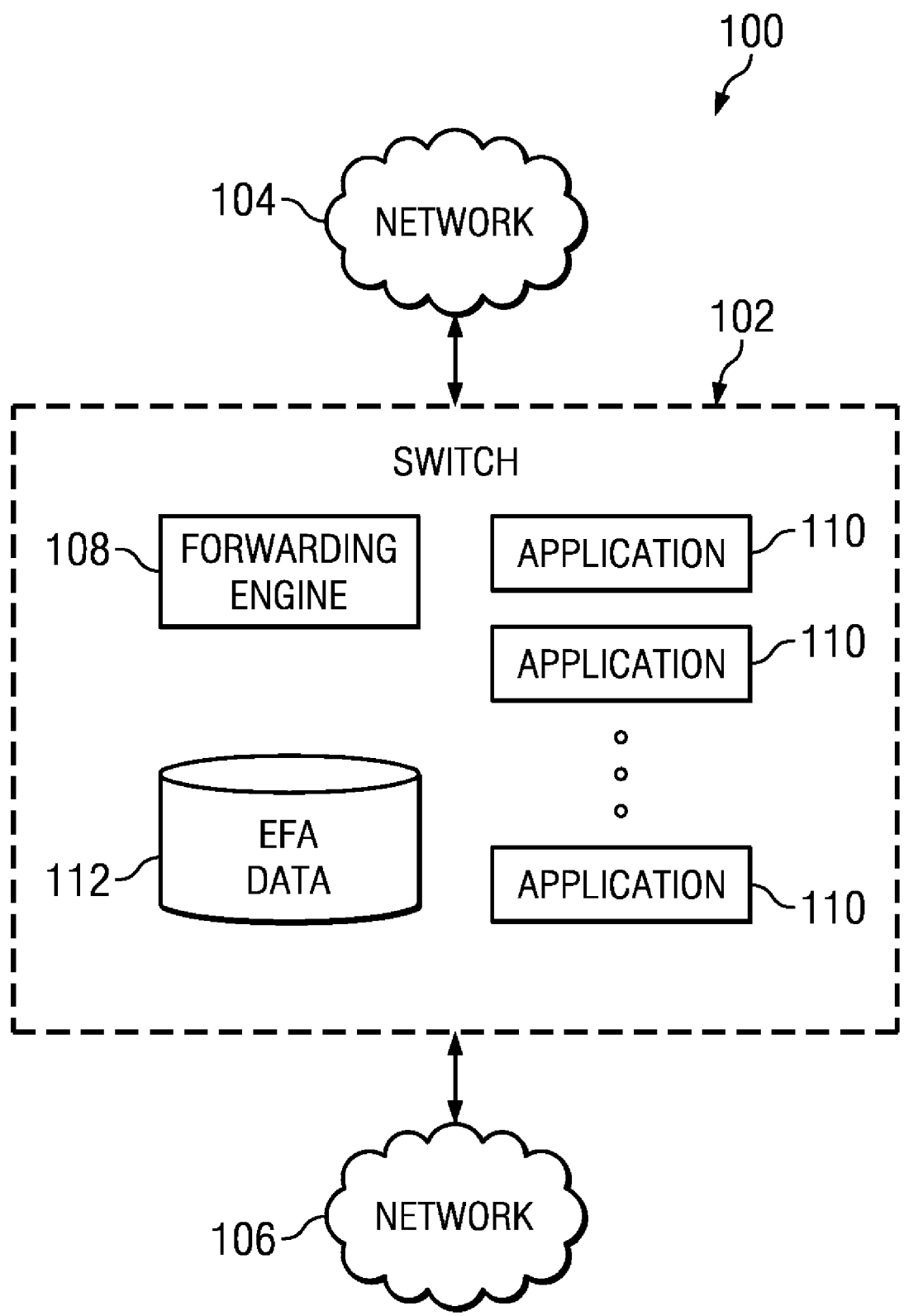
FIG. 1 illustrates an example system for dynamic, condition-based packet redirection.

FIG. 1 illustrates an example system 100 for dynamic, condition-based packet redirection. System 100 includes a switch 102 interconnecting networks 104 and 106. In particular embodiments, one or both of networks 104 and 106 are each an intranet, an extranet, a virtual private network (VPN), a local area network (LAN), a wireless LAN (WLAN), a wide area network (WAN), a metropolitan area network (MAN), a portion of the Internet, or another network or a combination of two or more such networks. Networks 104 and 106 may differ from each other in one or more respects. Networks 104 and 106 may be similar to each other in one or more respects. Although the present disclosure describes and illustrates two networks 104 and 106, the present disclosure contemplates any suitable number of networks. A data center may include one or both of networks 104 and 106. One or both of networks 104 and 106 may each or together be part of or make up a data center. The present disclosure contemplates any suitable networks 104 and 106. One or more links may couple each of networks 104 and 106 to switch 102. In particular embodiments, one or more such links each include one or more wireline, wireless, or optical links. In particular embodiments, one or more such links each include an intranet, an extranet, a VPN, a LAN, a WLAN, a WAN, a MAN, a portion of the Internet, or another link or a combination of two or more such links. In particular embodiments, a link may include one or more links. The present disclosure contemplates any suitable links coupling networks 104 and 106 to switch 102.

In particular embodiments, switch 102 includes a hardware or software element or a combination of two or more such elements providing switching functionality. Reference to switching may encompass routing, and vice versa, where appropriate. Switch 102 may include one or more switches 102. As an example and not by way of limitation, switch 102 may include one or more CISCO CATALYST 6500 series switches. Switch 102 may include one or more CISCO 7600 series routers. In particular embodiments, switch 102 is a NETFLOW-enabled router or switch. Switch 102 may include two or more devices coupled to each other that collective provide switching functionality. As an example and not by way of limitation, switch 102 may include a switching platform that includes one or more integrated-service blades or is coupled to one or more external appliances to deliver one or more services, such as, for example, firewall or other security services, Network Address Translation (NAT), application visibility and monitoring (AVM), statistics gathering, load balancing, proxying, VPN termination, or traffic shaping. Herein, reference to a service or network service may encompass a function or combination of functions that directly operates on a packet or stream of packets, or operates on information determined from a packet or stream of packets, where appropriate. Although the present disclosure describes and illustrates particular services, the present disclosure contemplates any suitable services. A service may include one or more rich services, where appropriate.

Switch 102 includes a forwarding engine 108 (or packet-forwarding engine) that is configured to receive packets, make packet-forwarding decisions, and transmit the packets according to the forwarding decisions. Forwarding engine 108 may also identify or classify one or more packet flows (or traffic or data flows) through switch 102 and monitor those packet flows. As an example and not by way of limitation, for each packet flow received by forwarding engine 108, forwarding engine 108 may inspect one or more transport headers of the packets in the packet flow, generate or update one or more metrics for the packet flow, access one or more instructions corresponding to the packet flow, and make routing decisions based on the inspections, metrics, or instructions.

In particular embodiments, to facilitate the delivery of services to clients in networks 104 or 106, forwarding engine 108 is configured to conditionally route or re-route (or direct, redirect, or divert) particular packet flows or one or more packets in a particular packet flow to one or more applications 110. An application 110 may include a hardware or software element or a combination of two or more such elements for providing one or more services, as described above. An application 110 may run on one or more service engines (or service nodes) which may be internal or external to switch 102. In particular embodiments, one or more integrated service blades (or blade servers or server blades) or external network appliances may embody or implement one or more applications 110. By way of example, a service node may be directly connected on one of the ports of switch 102, while a service node such as an external appliance may be logically connected via the Shared Internet Access (SIA) standard feature set to switch 102.

In particular embodiments, forwarding engine 108 is configured to inspect packets in packet flows, classify the packet flows, apply one or more policies to the packet flows, and route the packet flows (or individual packets in the packet flows) to one or more applications 110 for further processing to implement specific services as described above, or to networks 104 or 106 without additional processing by applications 110. In particular embodiments, applying one or more policies to a packet flow may include updating one or more metrics associated with the flow, determining if one or more conditions are met based on the metrics, and routing the packet flow based on the determination of whether the one or more conditions are met (satisfied).

Forwarding engine 108 may define a packet flow in one or more ways. As an example and not by limitation, forwarding engine 108 may define a packet flow using a 7-tuple key, where a packet flow is defined as a unidirectional sequence of packets all sharing the following seven values: (1) source IP address; (2) destination IP address; (3) source port; (4) destination port; (5) IP protocol; 6) ingress interface; and (7) IP type of service.

In particular embodiments, to provide a service to a packet flow, one or more applications 110 need not access or process all the packets in the packet flow. As an example and not by way of limitation, an application 110 may need to scan only the first N packets or bytes in a packet flow to provide a service to the packet flow. Hence, further processing of the packet flow may by unnecessary, at least for a period of time. A service blade may be allowed to add shortcuts to the forwarding plane of forwarding engine 108—which may be responsible for the actual process of sending a packet received on a logical interface to an outbound logical interface—so that forwarding engine 108 does not divert to application 110 packet flows that do not require further processing by application 110.

Such a shortcut may be implemented as a result of a request sent by application 110 to forwarding engine 108 that specifies specific tuples (such as, for example, 5-tuples) for packets or flows that application 110 does not need to process further. This technique (known as trusted flow acceleration (TFA)) may help reduce the load on application 110. TFA may enable the creation of shortcuts in NETFLOW so that a particular packet flow is not redirected to application 110. Particular embodiments may be used conjunction with the Service Insertion Architecture (SIA) model to extend the flow acceleration capability to data center or other applications 110.

Beyond various simple cases there is a large class of use cases for services that may not benefit from TFA techniques. In particular embodiments, for such applications 110, it may be desirable to not only suspend the processing of a particular flow by an application 110, but also to dynamically resume the processing of the flow by application 110 at a later time. More specifically, it may be desirable for an application 110 to occasionally or periodically inspect a particular flow for which re-routing to the corresponding service engine has been halted. Additionally, it may be desirable or necessary to resume re-routing of the previously-halted packet flow to the application 110 for processing. By way of example, it may be desirable to resume re-routing of the packet flow to the application 110 when there are changes in the traffic pattern of the flow.

In particular embodiments, various applications 110 running on corresponding service engines 110 are configured with the ability to request (to forwarding engine 108) the suspension of the re-routing of packets flows to the respective applications 110 while also being configured to specify conditions under which forwarding engine 108 must resume re-routing of the flows (or specific packets therein) to the respective applications 110 for further processing. In particular embodiments, such functionality may be realized using a new class of shortcuts referred to herein as Erasable Flow Acceleration (EFA) shortcuts (hereinafter also referred to as EFAs), and a new protocol that enables network administrators or applications 110 to initiate such shortcuts.

In particular embodiments, EFAs enable a network administrator or user administering or managing an application 110 running on a service engine to specify that a packet flow should not be re-routed to the service engine as well as conditions under which the forwarding engine 108 should resume redirecting the flow (or specific packets therein) to the application 110 for further processing, and, in particular embodiments, conditions under which the EFA should be erased.

In particular embodiments, the application 110 requesting the EFA shortcut sends an EFA request to forwarding engine 108 (e.g., in the form of an XML file or via an internal protocol), which then installs or otherwise saves the EFA shortcut. By way of example, in particular embodiments, forwarding engine 108 saves the EFA shortcut with a corresponding packet flow entry in EFA data 112. In particular embodiments, the EFA request sent by the requesting application 110 to forwarding engine 108 may specify one or more conditions each based on one or more predicates or metrics (hereinafter predicates and metrics may be used interchangably), as well as the action to be taken (e.g., resume redirecting the flow to the corresponding service engine or redirect the current packet to the corresponding service engine) when the condition is satisfied. As an example, packet forwarding engine 108 may update one or more metrics for a particular flow based on the packets received in the flow.

In particular embodiments, an application 110 may automatically install an EFA shortcut at forwarding engine 108 using an application programming interface (API). Particular embodiments may do this without any human intervention. (In particular embodiments, installing an EFA shortcut at forwarding engine 108 involves storing the EFA shortcut as EFA data 112. In some situations, a network administrator may not know a priori what conditions an EFA shortcut may include for a particular flow.) As an example, because packet flows may differ from each other and the types of analysis that an application 110 may perform may vary widely, application 110 may determine at run-time one or more particular condition for suspension or resumption of the re-direction of a particular packet flow to application 110. In particular embodiments, application 110 may automatically install an EFA shortcut at forwarding engine 108 at run-time to specify these conditions.

In a particular embodiment, one of the metrics may track a number of packets in a particular one of the packet flows received at forwarding engine 108, and one of the conditions that an EFA shortcut may include may specify that packets in the particular one of the packet flows are to be routed to the application 110 that made the EFA request when the number of packets exceeds a predetermined value. In a particular embodiment, one of the metrics may track a number of packets in a particular one of the packet flows received at forwarding engine 108, and one of the conditions that an EFA shortcut may include may specify that packets in the particular one of the packet flows are to be routed to the application 110 when the number of packets equals one of one or more predetermined values. In a particular embodiment, one of the metrics may track an actual sequencing of packets in a particular one of the packet flows received at forwarding engine 108, and one of the conditions that an EFA shortcut may include may specify that packets in the particular one of the packet flows are to be routed to the application 110 when the actual sequencing differs from a predetermined sequencing. In a particular embodiment, one of the conditions that an EFA shortcut may include may specify that packets in a particular one of the packet flows are to be routed to the application 110 after a predetermined time interval has lapsed. In a particular embodiment, one of the conditions that an EFA shortcut may include may specify that packets in a particular one of the packet flows are to be routed to the application 110 when the packets individually or collectively comprise an abnormal combination of one or more TCP flags. In a particular embodiment, one of the conditions that an EFA shortcut may include may specify that packets in a particular one of the packet flows are to be routed to the application 110 when the packets individually or collectively comprise a particular TCP flag (e.g., SYN). In a particular embodiment, one of the conditions that an EFA shortcut may include may specify that packets in a particular one of the packet flows are to be routed to the application 110 when a change that exceeds a predetermined value occurs in a TCP window size in the particular one of the packet flows. In a particular embodiment, one of the conditions that an EFA shortcut may include may specify that packets in a particular one of the packet flows are to be routed to the application 110 when a time interval between packets in the particular one of the packet flows exceeds a predetermined value. In a particular embodiment, one of the conditions that an EFA shortcut may include may specify that the request not to route a particular one of the packet flows to the application 110 is to be terminated if a predetermined event occurs (e.g., when one of one or more other conditions are met). In a particular embodiment, an EFA shortcut may include any suitable combination of two or more of these or other conditions.

Upon satisfying one or more of the specified conditions, forwarding engine 108 performs the action specified by the application 110 in the corresponding EFA. More particularly, if the action is to resume redirecting the corresponding flow to the requesting application 110, then forwarding engine 108 resumes redirecting the flow to the service engine for processing by the application. In particular embodiments, in such case, the action may in essence be realized by erasing the particular EFA. Alternately, if the specified action is to reroute the current packet, then forwarding engine 108 routes the current packet to the corresponding application 110 for processing by the application.

Furthermore, in particular embodiments, an application 110 may send a new EFA request for a particular flow to forwarding engine 108 at anytime to update or change the conditions associated with the flow stored in EFA data 112. In particular embodiments, an application 110 may also send to forwarding engine 108 an explicit erase command that causes the forwarding engine to erase the EFA entry for a particular flow at anytime. Sending an explicit erase command for a particular flow essentially removes the flow entry stored by forwarding engine 108 causing the forwarding engine to resume redirecting the flow to the application 110.

Additionally or alternately, in some embodiments, an application 110 may send an EFA request to forwarding engine 108 that may request the forwarding engine to route a particular one of the packet flows to the corresponding service engine for processing by the application 110, and identify one or more conditions for not routing particular ones of the packets in the particular one of the packet flows to the service engine. By way of example, in a particular embodiment, one of the metrics may track a number of packets in the particular one of the packet flows routed to the service engine, and one of the conditions that an EFA shortcut may include may specify that packets in the particular one of the packet flows are not to be routed to the application 110 when the number of packets exceeds a predetermined value. In a particular embodiment, one of the metrics may track a number of bits in the packets in the particular one of the packet flows routed to the application 110, and one of the conditions that an EFA shortcut may include may specify that packets in the particular one of the packet flows are not to be routed to the application 110 when the number of bits exceeds a predetermined value. In a particular embodiment, one of the conditions that an EFA shortcut may include may specify that packets in the particular one of the packet flows are not to be routed to the application 110 after a predetermined time interval has lapsed.

Figure 2:
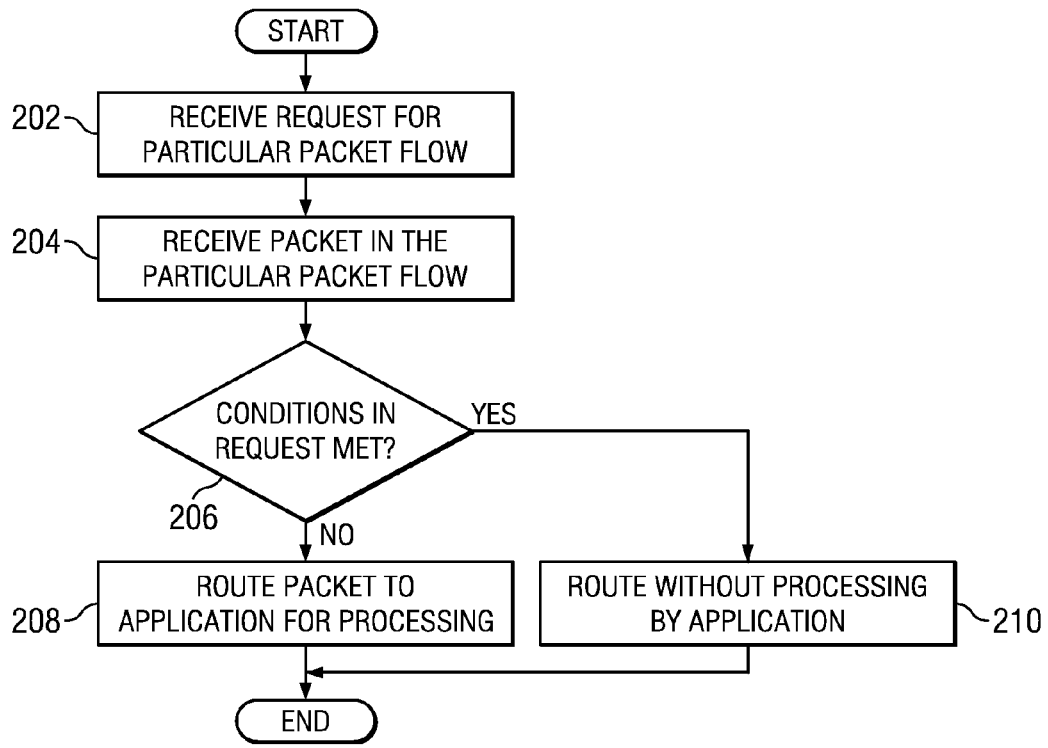
FIG. 2 shows a flowchart illustrating an example method for conditionally routing packets.

FIG. 2 shows a flowchart illustrating an example method for conditionally routing or not routing packets to one or more applications running on one or more service engines. In one embodiment, the method is implemented at a packet-forwarding engine for receiving packet flows and conditionally routing packets in the packet flows. In one embodiment, the method may begin at 202 with receiving from a particular one of the service engines a request that requests the packet-forwarding engine to route a particular one of the packet flows to the particular one of the service engines for processing by an application running on the service engine, and identifies one or more conditions for not routing particular ones of the packets in the particular one of the packet flows to the particular one of the service engines thereby bypassing processing by the application. The method may proceed at 204 with receiving a particular packet in the particular one of the packet flows. At 206, the packet-forwarding engine determines whether one or more of the conditions for not routing the particular packet to the particular one of the service engines are met. The packet-forwarding engine may then route the particular packet to the particular one of the service engines for processing at 208 if it is determined at 206 that the one or more conditions are not met. On the other hand, if the packet-forwarding engine determines that the one or more conditions are met, it then routes the packet to a next destination at 210 without processing by the application at the service engine.

Figure 3:
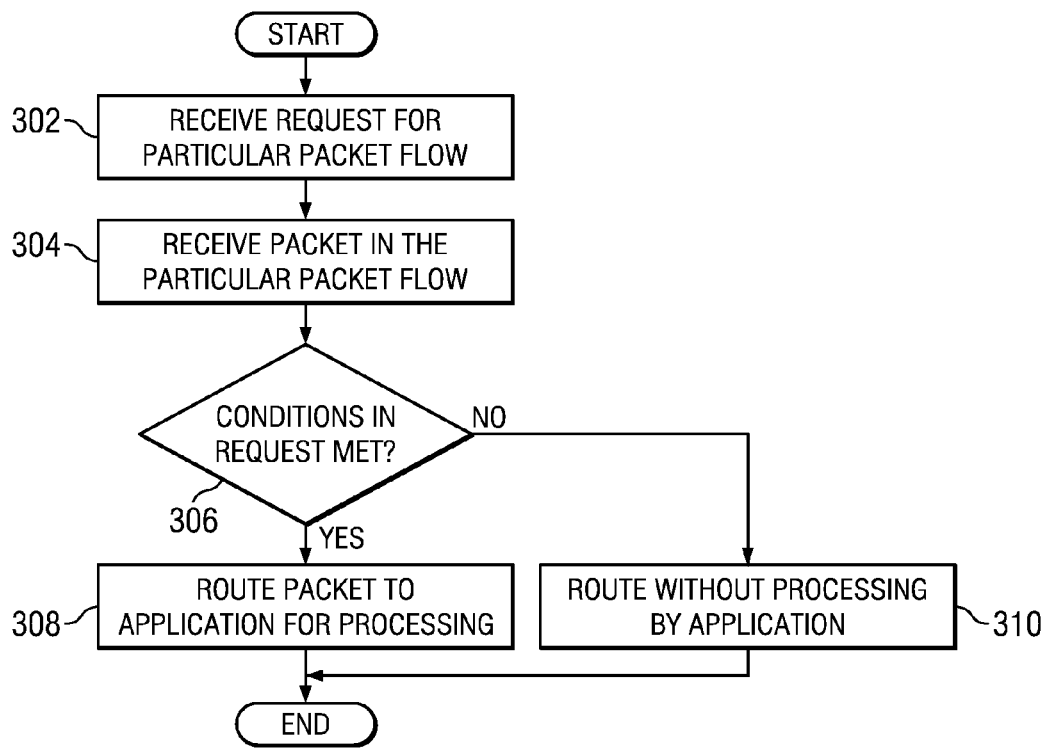
FIG. 3 shows a flowchart illustrating an example method for conditionally routing packets.

FIG. 3 shows a flowchart illustrating an example method for conditionally routing or not routing packets to one or more applications running on one or more service engines. In one embodiment, the method is implemented at a packet-forwarding engine for receiving packet flows and conditionally routing packets in the packet flows. In one embodiment, the method may begin at 302 with receiving from a particular one of the service engines a request that requests the packet-forwarding engine not to route a particular one of the packet flows to the particular one of the service engines thereby bypassing processing by an application running on the service engine, and identifies one or more conditions for routing particular ones of the packets in the particular one of the packet flows to the particular one of the service engines for processing by the application. The method may proceed at 304 with receiving a particular packet in the particular one of the packet flows. At 306, the packet-forwarding engine determines whether one or more of the conditions for routing the particular packet to the particular one of the service engines are met. The packet-forwarding engine may then route the particular packet to the particular one of the service engines for processing at 308 if it is determined at 306 that the one or more conditions are met. On the other hand, if the packet-forwarding engine determines that the one or more conditions are not met, it then routes the packet to a next destination without processing by the application at the service engine.

Although the present disclosure describes and illustrates particular components carrying out particular steps of the methods of FIGS. 2 and 3, the present disclosure contemplates any suitable combination of any suitable components carrying out any suitable steps of the methods of FIGS. 2 and 3.

Particular embodiments of switch 102 or any of its components may be implemented as hardware, software, or a combination of hardware and software. As an example and not by way of limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time", "offline", in "batch mode", otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable tangible storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 4:
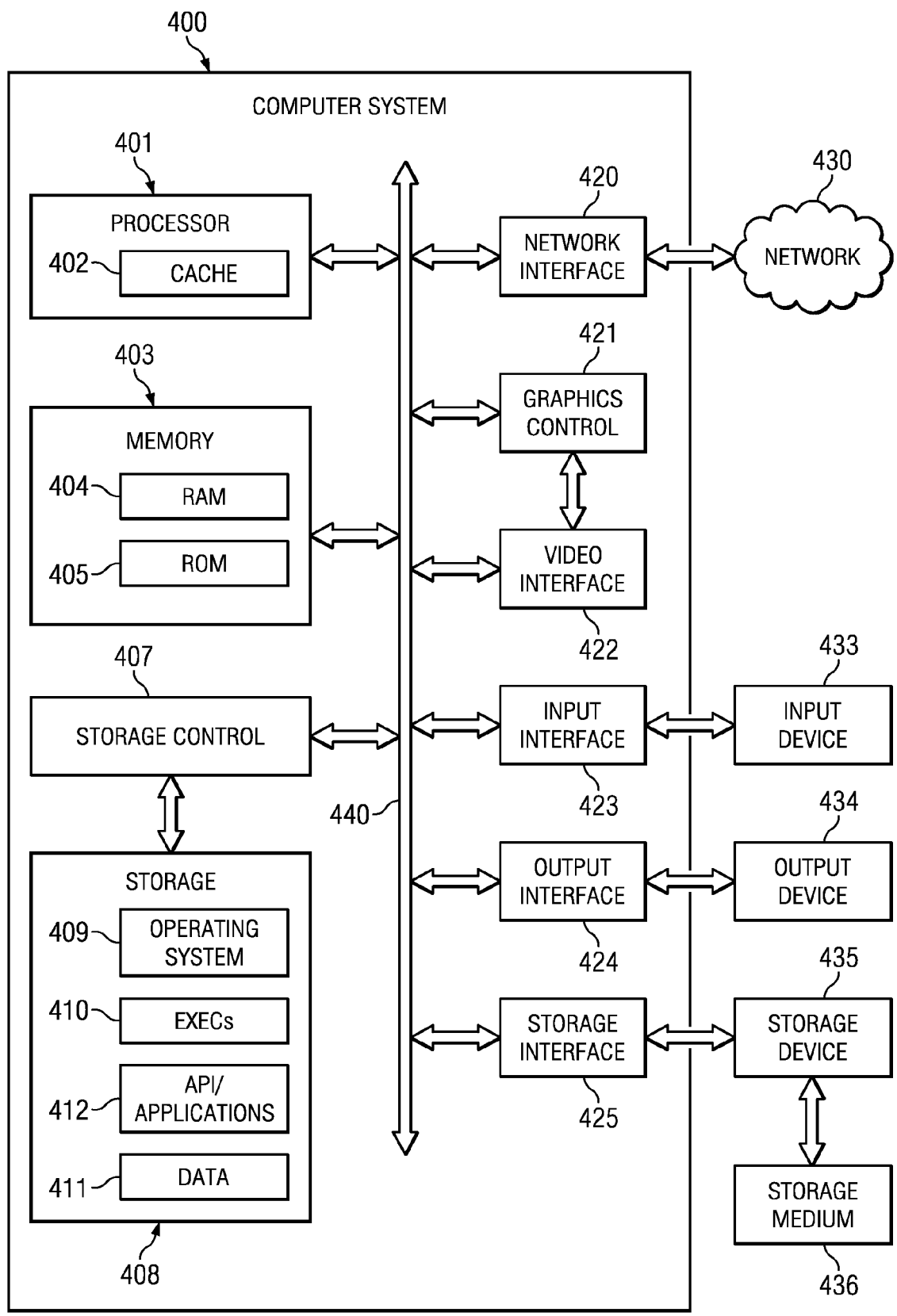
FIG. 4 illustrates an example computer system architecture.

For example, FIG. 4 illustrates an example computer system 400 suitable for implementing one or more portions of particular embodiments. Although the present disclosure describes and illustrates a particular computer system 400 having particular components in a particular configuration, the present disclosure contemplates any suitable computer system having any suitable components in any suitable configuration. Moreover, computer system 400 may have take any suitable physical form, such as for example one or more integrated circuit (ICs), one or more printed circuit boards (PCBs), one or more handheld or other devices (such as mobile telephones or PDAs), one or more personal computers, or one or more super computers.

Computer system 400 may have one or more input devices 433 (which may include a keypad, keyboard, mouse, stylus, etc.), one or more output devices 434 (which may include one or more displays, one or more speakers, etc.), one or more storage devices 435, and one or more storage media 436. An input device 433 may be external or internal to computer system 400. An output device 434 may be external or internal to computer system 400. A storage device 435 may be external or internal to computer system 400. A storage medium 436 may be external or internal to computer system 400.

System bus 440 couples subsystems of computer system 400 to each other. Herein, reference to a bus encompasses one or more digital signal lines serving a common function. The present disclosure contemplates any suitable system bus 440 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 400 includes one or more processors 401 (or central processing units (CPUs)). A processor 401 may contain a cache memory unit 402 for temporary local storage of instructions, data, or computer addresses. Processors 401 are coupled to one or more storage devices, including memory 403. Memory 403 may include random access memory (RAM) 404 and read-only memory (ROM) 405. Data and instructions may transfer bidirectionally between processors 401 and RAM 404. Data and instructions may transfer unidirectionally to processors 401 from ROM 405. RAM 404 and ROM 405 may include any suitable computer-readable storage media.

Computer system 400 includes fixed storage 408 coupled bi-directionally to processors 401. Fixed storage 408 may be coupled to processors 401 via storage control unit 407. Fixed storage 408 may provide additional data storage capacity and may include any suitable computer-readable storage media. Fixed storage 408 may store an operating system (OS) 409, one or more executables (EXECs) 410, one or more applications or programs 412, data 411 and the like. Fixed storage 408 is typically a secondary storage medium (such as a hard disk) that is slower than primary storage. In appropriate cases, the information stored by fixed storage 408 may be incorporated as virtual memory into memory 403.

Processors 401 may be coupled to a variety of interfaces, such as, for example, graphics control 421, video interface 422, input interface 423, output interface 424, and storage interface 425, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 420 may couple processors 401 to another computer system or to network 430. With network interface 420, processors 401 may receive or send information from or to network 430 in the course of performing steps of particular embodiments. Particular embodiments may execute solely on processors 401. Particular embodiments may execute on processors 401 and on one or more remote processors operating together.

In a network environment, where computer system 400 is connected to network 430, computer system 400 may communicate with other devices connected to network 430. Computer system 400 may communicate with network 430 via network interface 420. For example, computer system 400 may receive information (such as a request or a response from another device) from network 430 in the form of one or more incoming packets at network interface 420 and memory 403 may store the incoming packets for subsequent processing. Computer system 400 may send information (such as a request or a response to another device) to network 430 in the form of one or more outgoing packets from network interface 420, which memory 403 may store prior to being sent. Processors 401 may access an incoming or outgoing packet in memory 403 to process it, according to particular needs.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 403 may include one or more computer-readable storage media embodying software and computer system 400 may provide particular functionality described or illustrated herein as a result of processors 401 executing the software. Memory 403 may store and processors 401 may execute the software. Memory 403 may read the software from the computer-readable storage media in mass storage device 403 embodying the software or from one or more other sources via network interface 420. When executing the software, processors 401 may perform one or more steps of one or more processes described or illustrated herein, which may include defining one or more data structures for storage in memory 403 and modifying one or more of the data structures as directed by one or more portions the software, according to particular needs. In addition or as an alternative, computer system 400 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
at a packet-forwarding engine for receiving packet flows and conditionally routing packets in the packet flows to one or more applications, receiving from a particular one of the applications a request that requests the packet-forwarding engine to route a particular one of the packet flows to the particular one of the applications and identifies one or more conditions for not routing particular ones of the packets in the particular one of the packet flows to the particular one of the applications;
at the packet-forwarding engine, receiving a particular packet in the particular one of the packet flows;
at the packet-forwarding engine, determining whether one or more of the conditions for not routing the particular packet to the particular one of the applications are met;
at the packet-forwarding engine, routing or not routing the particular packet to the particular one of the applications based on the determination; and
updating one or more metrics based on the particular packet, wherein:
one of the metrics tracks a number of packets in the particular one of the packet flows routed to the particular one of the applications; and
one of the conditions specifies that packets in the particular one of the packet flows are not to be routed to the particular one of the applications when the number of packets exceeds a predetermined value.

2. The method of claim 1, wherein one of the conditions specifies that packets in the particular one of the packet flows are not to be routed to the particular one of the applications after a predetermined time interval has lapsed.

3. A method comprising:
at a packet-forwarding engine for receiving packet flows and conditionally routing packets in the packet flows to one or more applications, receiving from a particular one of the applications a request that requests the packet-forwarding engine to route a particular one of the packet flows to the particular one of the applications and identifies one or more conditions for not routing particular ones of the packets in the particular one of the packet flows to the particular one of the applications;
at the packet-forwarding engine, receiving a particular packet in the particular one of the packet flows;
at the packet-forwarding engine, determining whether one or more of the conditions for not routing the particular packet to the particular one of the applications are met;
at the packet-forwarding engine, routing or not routing the particular packet to the particular one of the applications based on the determination; and
updating one or more metrics based on the particular packet, wherein:
one of the metrics tracks a number of bits in the packets in the particular one of the packet flows routed to the particular one of the applications; and
one of the conditions specifies that packets in the particular one of the packet flows are not to be routed to the particular one of the applications when the number of bits in the packets exceeds a predetermined value.

4. A method comprising:
at a packet-forwarding engine for receiving packet flows and conditionally routing packets in the packet flows to one or more applications, receiving from a particular one of the applications a request that requests the packet-forwarding engine not to route a particular one of the packet flows to the particular one of the applications and identifies one or more conditions for routing particular ones of the packets in the particular one of the packet flows to the particular one of the applications;
at the packet-forwarding engine, receiving a particular packet in the particular one of the packet flows;
at the packet-forwarding engine, determining whether one or more of the conditions for routing the particular packet to the particular one of the applications are met~at the packet-forwarding engine, routing or not routing the particular packet to the particular one of the applications based on the determination; and
updating one or more metrics based on the particular packet, wherein:
one of the metrics tracks a number of packets in the particular one of the packet flows received at the packet-forwarding engine; and
one of the conditions specifies that packets in the particular one of the packet flows are to be routed to the particular one of the applications when the number of packets exceeds a predetermined value.

5. A method comprising:
at a packet-forwarding engine for receiving packet flows and conditionally routing packets in the packet flows to one or more applications, receiving from a particular one of the applications a request that requests the packet-forwarding engine not to route a particular one of the packet flows to the particular one of the applications and identifies one or more conditions for routing particular ones of the packets in the particular one of the packet flows to the particular one of the applications;
at the packet-forwarding engine, receiving a particular packet in the particular one of the packet flows;
at the packet-forwarding engine, determining whether one or more of the conditions for routing the particular packet to the particular one of the applications are at the packet-forwarding engine, routing or not routing the particular packet to the particular one of the applications based on the determination; and
updating one or more metrics based on the particular packet, wherein:
one of the metrics tracks a number of packets in the particular one of the packet flows received at the packet-forwarding engine; and
one of the conditions specifies that packets in the particular one of the packet flows are to be routed to the particular one of the applications when the number of packets equals one of one or more predetermined values.

6. A method comprising:
at a packet-forwarding engine for receiving packet flows and conditionally routing packets in the packet flows to one or more applications, receiving from a particular one of the applications a request that requests the packet-forwarding engine not to route a particular one of the packet flows to the particular one of the applications and identifies one or more conditions for routing particular ones of the packets in the particular one of the packet flows to the particular one of the applications;
at the packet-forwarding engine, receiving a particular packet in the particular one of the packet flows;
at the packet-forwarding engine, determining whether one or more of the conditions for routing the particular packet to the particular one of the applications are met;

at the packet-forwarding engine, routing or not routing the particular packet to the particular one of the applications based on the determination; and updating one or more metrics based on the particular packet, wherein:

one of the metrics tracks an actual sequencing of packets in the particular one of the packet flows received at the packet-forwarding engine; and one of the conditions specifies that packets in the particular one of the packet flows are to be routed to the particular one of the applications when the actual sequencing differs from a predetermined sequencing.

7. The method comprising:

at a packet-forwarding engine for receiving packet flows and conditionally routing packets in the packet flows to one or more applications, receiving from a particular one of the applications a request that requests the packet-forwarding engine not to route a particular one of the packet flows to the particular one of the applications and identifies one or more conditions for routing particular ones of the packets in the particular one of the packet flows to the particular one of the applications;

at the packet-forwarding engine, receiving a particular packet in the particular one of the packet flows;

at the packet-forwarding engine, determining whether one or more of the conditions for routing the particular packet to the particular one of the applications are met; and at the packet-forwarding engine, routing or not routing the particular packet to the particular one of the applications based on the determination, wherein one of the conditions specifies that packets in the particular one of the packet flows are to be routed to the particular one of the applications when a time interval between packets in the particular one of the packet flows exceeds a predetermined value.

8. A method comprising:

at a packet-forwarding engine for receiving packet flows and conditionally routing packets in the packet flows to one or more applications, receiving from a particular one of the applications a request that requests the packet-forwarding engine not to route a particular one of the packet flows to the particular one of the applications and identifies one or more conditions for routing particular ones of the packets in the particular one of the packet flows to the particular one of the applications;

at the packet-forwarding engine, receiving a particular packet in the particular one of the packet flows;

at the packet-forwarding engine, determining whether one or more of the conditions for routing the particular packet to the particular one of the applications are met; and at the packet-forwarding engine, routing or not routing the particular packet to the particular one of the applications based on the determination, wherein one of the conditions specifies that the request not to route the particular one of the packet flows to the particular one of the applications is to be terminated if a predetermined event occurs.

9. The method of claim 8, wherein one of the conditions specifies that packets in the particular one of the packet flows are to be routed to the particular one of the applications after a predetermined time interval has lapsed.

10. The method of claim 8, wherein one of the conditions specifies that packets in the particular one of the packet flows are to be routed to the particular one of the applications when the packets individually or collectively comprise an abnormal combination of one or more Transmission Control Protocol (TCP) flags.

11. The method of claim 8, wherein one of the conditions specifies that packets in the particular one of the packet flows are to be routed to the particular one of the applications when the packets individually or collectively comprise a particular Transmission Control Protocol (TCP) flag.

12. The method of claim 8, wherein one of the conditions specifies that packets in the particular one of the packet flows are to be routed to the particular one of the applications when a change that exceeds a predetermined value occurs in a Transmission Control Protocol (TCP) window size in the particular one of the packet flows.

13. The method of claim 8, wherein one of the conditions specifies that packets in the particular one of the packet flows are to be routed to the particular one of the applications when a number of packets in the particular one of the packet flows exceeds a predetermined value.

14. The method of claim 8, wherein one of the conditions specifies that packets in the particular one of the packet flows are to be routed to the particular one of the applications when a number of packets in the particular one of the packet flows equals one or more predetermined values.

15. The method of claim 8, wherein one of the conditions specifies that packets in the particular one of the packet flows are to be routed to the particular one of the applications when an actual sequencing of packets in the particular one of the packet flows differs from a predetermined sequencing.

16. One or more non-transitory computer-readable storage media encoding software that is operable when executed to:

receive from a particular one of one or more applications a request to route a particular one of one or more packet flows to the particular one of the applications, wherein the request also identifies one or more conditions for not routing particular ones of the packets in the particular one of the packet flows to the particular one of the applications;

receive a particular packet in the particular one of the packet flows;

determine whether one or more of the conditions for not routing the particular packet to the particular one of the applications are met;

route or not route the particular packet to the particular one of the applications based on the determination; and update one or more metrics based on the particular packet, wherein:

one of the metrics tracks a number of packets in the particular one of the packet flows routed to the particular one of the applications; and one of the conditions specifies that packets in the particular one of the packet flows are not to be routed to the particular one of the applications when the number of packets exceeds a predetermined value.

17. The one or more non-transitory computer-readable storage media of claim 16, wherein one of the conditions specifies that packets in the particular one of the packet flows are not to be routed to the particular one of the applications after a predetermined time interval has lapsed.

18. One or more non-transitory computer-readable storage media encoding software that is operable when executed to:

receive from a particular one of one or more applications a request to route a particular one of one or more packet flows to the particular one of the applications, wherein the request also identifies one or more conditions for not routing particular ones of the packets in the particular one of the packet flows to the particular one of the applications;

receive a particular packet in the particular one of the packet flows;

determine whether one or more of the conditions for not routing the particular packet to the particular one of the applications are met;

route or not route the particular packet to the particular one of the applications based on the determination; and update one or more metrics based on the particular packet, wherein:

one of the metrics tracks a number of bits in the packets in the particular one of the packet flows routed to the particular one of the applications; and one of the conditions specifies that packets in the particular one of the packet flows are not to be routed to the particular one of the applications when the number of bits in the packets exceeds a predetermined value.

19. One or more non-transitory computer-readable storage media embodying software that is operable when executed to:

receive from a particular one of one or more applications a request not to route a particular one of one or more packet flows to the particular one of the applications, wherein the request also identifies one or more conditions for routing particular ones of the packets in the particular one of the packet flows to the particular one of the applications;

receive a particular packet in the particular one of the packet flows;

determine whether one or more of the conditions for routing the particular packet to the particular one of the applications are met;

route or not route the particular packet to the particular one of the applications based on the determination; and update one or more metrics based on the particular packet, wherein:

one of the metrics tracks a number of packets in the particular one of the packet flows received at the packet-forwarding engine; and one of the conditions specifies that packets in the particular one of the packet flows are to be routed to the particular one of the applications when the number of packets exceeds a predetermined value.

20. One or more non-transitory, computer-readable storage media embodying software that is operable when executed to:

receive from a particular one of one or more applications a request not to route a particular one of one or more packet flows to the particular one of the applications, wherein the request also identifies one or more conditions for routing particular ones of the packets in the particular one, of the packet flows to the particular one of the applications;

receive a particular packet in the particular one of the packet flows;

determine whether one or more of the conditions for routing the particular packet to the particular one of the applications are met;

route or not route the particular packet to the particular one of the applications based on the determination; and update one or more metrics based on the particular packet, wherein:

one of the metrics tracks a number of packets in the particular one of the packet flows received at the packet-forwarding engine; and one of the conditions specifies that packets in the particular one of the packet flows are to be routed to the particular one of the applications when the number of packets equals one of one or more predetermined values.

21. One or more non-transitory computer-readable storage media embodying software that is operable when executed to:

receive from a particular one of one or more applications a request not to route a particular one of one or more packet flows to the particular one of the applications, wherein the request also identifies one or more conditions for routing particular ones of the packets in the particular one of the packet flows to the particular one of the applications;

receive a particular packet in the particular one of the packet flows;

determine whether one or more of the conditions for routing the particular packet to the particular one of the applications are met;

route or not route the particular packet to the particular one of the applications based on the determination; and update one or more metrics based on the particular packet, wherein:

one of the metrics tracks an actual sequencing of packets in the particular one of the packet flows received at the packet-forwarding engine; and one of the conditions specifies that packets in the particular one of the packet flows are to be routed to the particular one of the applications when the actual sequencing differs from a predetermined sequencing.

22. One or more non-transitory computer-readable storage media embodying software that is operable when executed to:

receive from a particular one of one or more applications a request not to route a particular one of one or more packet flows to the particular one of the applications, wherein the request also identifies one or more conditions for routing particular ones of the packets in the particular one of the packet flows to the particular one of the applications;

receive a particular packet in the particular one of the packet flows;

determine whether one or more of the conditions for routing the particular packet to the particular one of the applications are met; and route or not route the particular packet to the particular one of the applications based on the determination, wherein one of the conditions specifies that packets in the particular one of the packet flows are to be routed to the particular one of the applications when a time interval between packets in the particular one of the packet flows exceeds a predetermined value.

23. One or more non-transitory computer-readable storage media embodying software that is operable when executed to:

receive from a particular one of one or more applications a request not to route a particular one of one or more packet flows to the particular one of the applications, wherein the request also identifies one or more conditions for routing particular ones of the packets in the particular one of the packet flows to the particular one of the applications;

receive a particular packet in the particular one of the packet flows;

determine whether one or more of the conditions for routing the particular packet to the particular one of the applications are met; and route or not route the particular packet to the particular one of the applications based on the determination, wherein one of the conditions specifies that the request not to route the particular one of the packet flows to the particular one of the applications is to be terminated if a predetermined event occurs.

24. The one or more non-transitory computer-readable storage media of claim 23, wherein one of the conditions specifies that packets in the particular one of the packet flows are to be routed to the particular one of the applications after a predetermined time interval has lapsed.

25. The one or more non-transitory computer-readable storage media of claim 23, wherein one of the conditions specifies that packets in the particular one of the packet flows are to be routed to the particular one of the applications when the packets individually or collectively comprise an abnormal combination of one or more Transmission Control Protocol (TCP) flags.

26. The one or more non-transitory computer-readable storage media of claim 23, wherein one of the conditions specifies that packets in the particular one of the packet flows are to be routed to the particular one of the applications when the packets individually or collectively comprise a particular Transmission Control Protocol (TCP) flag.

27. The one or more non-transitory computer-readable storage media of claim 23, wherein one of the conditions specifies that packets in the particular one of the packet flows are to be routed to the particular one of the applications when a change that exceeds a predetermined value occurs in a Transmission Control Protocol (TCP) window size in the particular one of the packet flows.

28. The one or more non-transitory computer-readable storage media of claim 23, wherein one of the conditions specifies that packets in the particular one of the packet flows are to be routed to the particular one of the applications when a number of packets in the particular one of the packet flows exceeds a predetermined value.

29. The one or more non-transitory computer-readable storage media of claim 23, wherein one of the conditions specifies that packets in the particular one of the packet flows are to be routed to the particular one of the applications when a number of packets in the particular one of the packet flows equals one or more predetermined values.

30. The one or more non-transitory computer-readable storage media of claim 23, wherein one of the conditions specifies that packets in the particular one of the packet flows are to be routed to the particular one of the applications when an actual sequencing of packets in the particular one of the packet flows differs from a predetermined sequencing.

* * * * *